United States Patent
Vulkan et al.

(10) Patent No.: US 7,913,712 B2
(45) Date of Patent: Mar. 29, 2011

(54) FUEL ACCESSORY FOR FUEL TANK AND METHOD FOR INTERNALLY ATTACHING SAME

(75) Inventors: Omer Vulkan, D.N. Halutza (IL);
Yehoshua Kleinberg, Beer Sheva (IL);
Moshe Ehrman, D.N. Halutza (IL)

(73) Assignee: Raval A.C.S. Ltd., D.N. Halutza (IL)

( * ) Notice: Subject to any disclaimer, the term of this patent is extended or adjusted under 35 U.S.C. 154(b) by 0 days.

(21) Appl. No.: 12/213,638

(22) Filed: Jun. 23, 2008

(65) Prior Publication Data
US 2009/0000599 A1    Jan. 1, 2009

Related U.S. Application Data

(63) Continuation-in-part of application No. 10/760,718, filed on Jan. 21, 2004, now Pat. No. 7,389,789.

(51) Int. Cl.
*F16K 31/18*    (2006.01)
*F16K 43/00*    (2006.01)
*F02M 37/04*   (2006.01)

(52) U.S. Cl. ............. 137/315.11; 137/15.17; 156/379.8; 156/380.2; 264/405

(58) Field of Classification Search ............... 137/15.17, 137/315.11, 341; 156/349, 379.7, 379.8, 156/380.2, 380.3; 264/248, 405
See application file for complete search history.

(56) References Cited

U.S. PATENT DOCUMENTS

| | | | |
|---|---|---|---|
| 4,108,713 A * | 8/1978 | Weisz | ............................ 156/499 |
| 4,455,754 A | 6/1984 | Benjamin | |
| 4,505,636 A | 3/1985 | Sugino et al. | |
| 4,989,629 A | 2/1991 | Shirakawa | |
| 5,169,176 A | 12/1992 | Brossard | |
| 5,277,217 A * | 1/1994 | Kobayashi et al. | ............. 137/39 |
| 5,404,907 A | 4/1995 | Benjey et al. | |
| 5,968,442 A * | 10/1999 | Sato et al. | ..................... 264/449 |
| 6,035,883 A | 3/2000 | Benjey | |
| 6,289,915 B1 | 9/2001 | Nulman et al. | |
| 6,357,101 B1 | 3/2002 | Sarh et al. | |
| 6,368,448 B1 * | 4/2002 | Okamura et al. | .......... 156/274.2 |

(Continued)

FOREIGN PATENT DOCUMENTS

CN    1427766    7/2003

(Continued)

OTHER PUBLICATIONS

Ishlinsky, A.Y., "Polytechnic Dictionary", "Sovetskaya Entsiklopedia", Moscow 1989, pp. 236, 483, with English translation of relevant parts.

(Continued)

*Primary Examiner* — Kevin L Lee
(74) *Attorney, Agent, or Firm* — The Nath Law Group; Susanne M. Hopkins

(57) ABSTRACT

A fuel tank made of a plastic material and fitted with at least one fuel accessory attached to an inside surface of a wall thereof, wherein the fuel accessory is attached to a predetermined site at the inside surface by fusion welding. Further there is disclosed a fuel accessory for attaching to a site at an inside wall portion of a plastic material fuel tank, comprising a housing formed with an engaging surface attachable to the site. The engaging surface is fitted with a fusion melting element for fusion welding the fuel accessory to the fuel tank.

38 Claims, 13 Drawing Sheets

U.S. PATENT DOCUMENTS

| | | |
|---|---|---|
| 6,499,500 B2 * | 12/2002 | Rosseel ............... 137/15.17 |
| 6,701,952 B1 * | 3/2004 | Ehrman et al. ............ 137/202 |
| 6,742,536 B2 | 6/2004 | Mills |
| 6,810,913 B2 * | 11/2004 | Potter et al. ............ 137/797 |
| 6,840,274 B1 | 1/2005 | Williamson et al. |
| 6,863,082 B1 * | 3/2005 | McIntosh et al. ........ 137/202 |
| 7,204,520 B2 | 4/2007 | Mueller et al. |
| 7,389,789 B2 * | 6/2008 | Vulkan et al. ........ 137/315.08 |
| 2001/0013516 A1 | 8/2001 | Boecker |
| 2003/0116282 A1 * | 6/2003 | Hutter, III ............ 156/380.2 |
| 2003/0168853 A1 | 9/2003 | Mueller et al. |
| 2004/0134518 A1 | 7/2004 | Kraus et al. |

FOREIGN PATENT DOCUMENTS

| | | |
|---|---|---|
| DE | 3422074 | 1/1986 |
| EP | 1 310 715 | 5/2003 |
| GB | 2 408 972 A | 6/2005 |
| JP | 62-288029 A | 12/1987 |
| JP | 63-189228 A | 8/1988 |
| JP | 1-210331 A | 8/1989 |
| JP | 8 224784 | 9/1996 |
| JP | 10 220676 | 8/1998 |
| JP | 10 246381 | 9/1998 |
| JP | 10 246382 | 9/1998 |
| JP | 11 254539 | 9/1999 |
| JP | 2002-340101 A | 11/2002 |
| JP | 2002-373050 A | 12/2002 |
| JP | 2003-191341 A | 7/2003 |
| RU | 2 009 834 C1 | 3/1994 |
| WO | WO 93/22127 | 11/1993 |
| WO | WO 01/07806 | 2/2001 |
| WO | WO 02/11973 | 2/2002 |
| WO | WO 02/14041 | 2/2002 |
| WO | 2005/070718 A1 | 8/2005 |

OTHER PUBLICATIONS

Mikhaylovsky, E.V., "Car Facilities, 6th revision", "Mashinostroyeniye", 1987, pp. 99, with English translation of relevant parts.

* cited by examiner

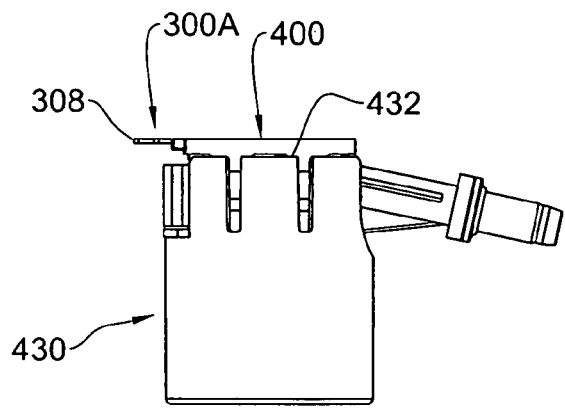
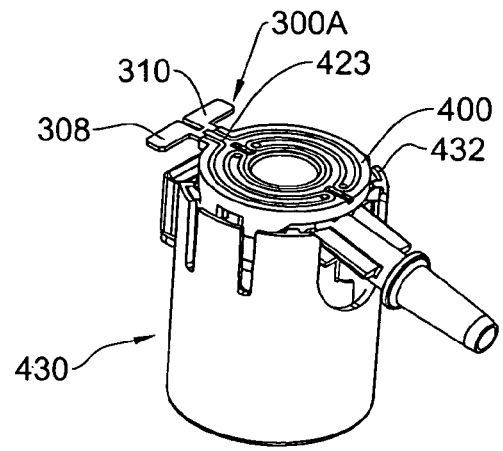
FIG. 10A    FIG. 10B
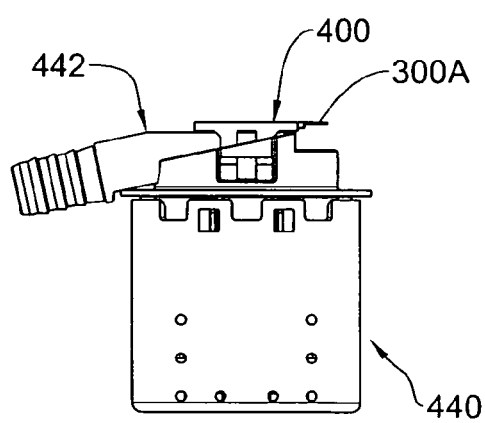
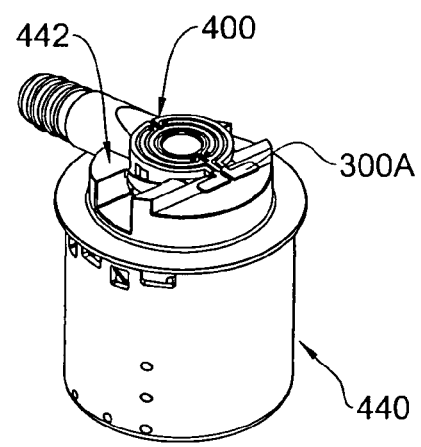
FIG. 11A    FIG. 11B

FUEL ACCESSORY FOR FUEL TANK AND METHOD FOR INTERNALLY ATTACHING SAME

This is a Continuation-In-Part of U.S. application Ser. No. 10/760,718 filed Jan. 21, 2004, the contents of which are hereby incorporated by reference in their entirety

FIELD OF THE INVENTION

The present invention generally relates to fuel tanks and fuel accessories therefore. More particularly, the invention is directed to a method for attaching a fuel accessory within a fuel tank in a fuel-impermeable manner. The invention is further concerned with fuel accessories suitable for attaching to a fuel tank by such a method.

The term 'fuel accessory' as used herein the specification and claims is used to denote any of a variety of devices/fittings commonly attached within fuel tanks (i.e. fuel system components), such as valves of different types (vent valves, rollover valves, over filling intermitting valves, etc), liquid traps, gauges, filters, etc. and also a seating/carrier attached to the fuel tank and which in turn various valve members are attached thereto.

BACKGROUND OF THE INVENTION

A variety of valves and various other devices are commonly fitted within a vehicle's fuel tank. It is common practice to connect such fuel accessories within a fuel tank by forming an aperture of a size comfortably accommodating the valve's housing, and fixedly attaching the valve by various means, e.g. welding, heat welding, different fasteners, etc.

However, this arrangement has several drawbacks. First, as a consequence of the above arrangement, a portion of the fuel accessories projects from an outside surface of the tank and further, and typically some tubing extends between the fuel accessories which also leis attached to the external surface of the tank.

Second, it is necessary to provide suitable sealing arrangements between the housing and the fuel accessory's housing which often has associated thereto some electric wiring or tubing.

It is thus a growing trend to form as little as possible openings in the tank (ideally only one), and accordingly venting system with its associated valves and connections are relocated as far as possible into the tank.

Another serious consideration concerned with vehicle fuel tanks is the ever-growing requirement of environment concerned organizations and authorities that the rate of fuel permeation from the fuel tank and its associated fuel accessories be minimal. The outcome of this requirement is that new connection means are now required for ensuring essentially permeation-free connection between the fuel accessories and the fuel tank.

Accordingly, it is becoming standard practice to manufacture multi-layered plastic fuel tanks having a substantive low permeation rate to fuel hydrocarbons, and where valves are fitted to such tanks with suitable sealing arrangements or heat welded to an inside wall surface of the tank.

Still another issue concerning connection of valves to vehicle fuel tanks is the effective operation level of the valves, namely the level at which the valve closes (at times referred to as cut-off or shut-off level) and the level at which the valve reopens. One of the considerations governing the operative level is space consuming which is of significant importance in particular in vehicles. It is thus a requirement that the "dead space" i.e. the space between "maximum fuel level" and the top wall of the fuel tank, be reduced to minimum, and care has to be taken not to increase the dead space.

Several patents are concerned with providing a fuel-impermeable attachment of the valve to the fuel tank. For example, U.S. Pat. Nos. 5,404,907, 6,035,883 and 6,289,915 disclose different weldable valve assemblies comprising a valve body extending through an opening formed in the fuel tank, and a weldable connector portion fastened to or integrated with the valve body, for welding onto the outer surface of the polymeric fuel tank.

Another method for attaching valves into a fuel tank is by thermo-forming two mating halves of the tank and pressing the valves and any other fuel accessories are pressed to the tank wall immediately after forming while still partially molten. Then, the two halves of the tank are attached and welded to one another. This method is time consuming and even more so there is a severe risk of leak or permeation through the line of weld of the two tank halves.

A different concept is disclosed in WO Patent Application WO0107806A1 also concerned with minimizing the dead space, wherein there is disclosed a fuel valve comprising a housing entirely received within a fluid tank wherein according to one application, the housing of the valve is formed at an uppermost portion thereof with a stem member for fixedly receiving within a corresponding receptacle formed at a top wall of the tank. According to a second application, the housing of the valve is formed at a top portion thereof with a first connecting member adapted for engagement with a corresponding second connecting member integral with a top wall of the tank, e.g. a snap-type connection.

Still another method for attaching fuel accessories to a fuel tank is disclosed in U.S. Patent Application Serial No. US20010013516A1 directed to the so called 'ship in the bottle' technique, where during blow molding of the tank one or more valves and other fuel accessories are supported by a support fitting (carrier member), whereby as the tank is formed it integrates with the support fitting by heat welding. This is a complicated and costly procedure.

SUMMARY OF THE INVENTION

According to a first aspect of the invention there is provided a fuel tank made of a plastic material and fitted with at least one fuel accessory attached to an inside surface of a wall thereof, wherein said fuel accessory is attached to a predetermined site at said inside surface by fusion welding facilitated by a fusion melting element extending between the elements. According to a particular embodiment one of the fuel accessory and the site at the inside surface of the fuel tank is fitted with a fusion melting element (at times referred to as a 'weld insert'), which may be integrated with or added to either of the components.

Fusion welding occurs when the plastic components, i.e. the inside wall site of the fuel tank and a portion of the fuel accessory, both made of a suitable plastic material (e.g. thermoplastic), are attached to one another and the temperature of at least one of the adjoining surfaces is raised above the melting point of the material. Upon cooling thereof, the components remain welded to one another.

According to a second aspect of the invention there is provided a fuel accessory for attaching to a site at an inside wall portion of a plastic material fuel tank, comprising a housing formed with an engaging surface attachable to said site; wherein said at least a portion of the engaging surface is made of plastic material and is fitted with a fusion melting element for fusion welding the fuel accessory to the fuel tank.

According to a third aspect of the present invention there is provided a method for attaching a fuel accessory to a fuel tank made of a plastic material; wherein one of the fuel accessory and a site at the inside surface of the fuel tank is fitted with a fusion melting element and where attaching the fuel accessory is carried out by fusion welding.

According to a fourth aspect of the present invention there is provided a manipulator for introducing and attaching by fusion welding a fuel accessory to a site at an inside wall of fuel tank, said manipulator configured as an arm for introducing into an interior space of the fuel tank through an opening formed in the tank.

According to a further aspect of the present invention there is provided a fuel system component for attaching to a site at an inside wall portion of a plastic material fuel tank, the fuel system component comprising a housing having a top surface adapted to be pre-fitted with a fusion melting element.

The housing may further comprise a side wall extending from the top surface thereof, which may be a single-layered wall having an outer surface in fluid communication with the fuel tank and an inner surface in fluid communication with at least one functional component of the fuel system component. The top surface of the housing may be formed with a shape corresponding with that of the wall portion at the site, for flush engagement therewith.

It will be therefore be appreciated that one of the advantages of a fuel system component comprising a housing having a top surface adapted to be pre-fitted with a fusion melting element, may be that such fuel system component may comprise a single-layered wall, thereby requiring less material and space than if a carrying member comprising a wall disposed adjacent to a wall of the fuel system component housing, i.e. a second wall, is utilized.

The top surface of the housing may be adapted to be pre-fitted with a fusion melting element by being formed with grooves of sufficient size to allow the fusion melting element to be placed therein. The top surface may comprise plastic material of a height sufficient to allow attachment of fuel system component to the fuel tank by melting of the plastic material, without damaging the fuel system component. The fusion melting element may be pre-fitted to the top surface of the housing by placement thereof in the grooves.

The fusion melting element may be attached to a planar weldable carrying member comprising an upper surface and an opposing lower surface. In such case the lower surface of the planar weldable carrying member may be adapted to be pre-fitted to the top surface of the housing of the fuel system component. The lower surface of the planar weldable carrying member may be adapted to be pre-fitted by being formed with a mechanical joining mechanism selected from the group including snap-lock members, threaded members and bayonet members, in which case the top surface of the fuel system component is adapted to be pre-fitted to the lower surface of the planar weldable carrying member may be formed with a mechanical joining mechanism corresponding to that of the selected mechanical joining mechanism of the planar weldable carrying member. Alternatively, the top surface of the housing may be adapted to be pre-fitted by having a bonding agent applied thereto and the lower surface of the planar weldable carrying member may be pre-fitted thereto via the bonding agent.

The fusion melting element may have a maximal diameter smaller than a maximal diameter of the top surface of the housing. The fusion melting element may have a maximal diameter in the range of about. The fusion melting element may comprise elongated conductive portions. The elongated conductive portions including at least a first portion distal from a central part of the fusion melting element, and at least a second portion disposed intermediate the at least one distal portion and the central part. The elongated conductive portions may include a plurality of large C-shaped sub-portions connected in series by a plurality of small C-shaped sub-portions. The fusion melting element may comprise first and second conductive ends adapted to be detached from the fusion melting element by applying a pulling force thereto, when the fusion melting element has been welded to another object.

As will be appreciated, one of the advantages of using a planar carrying member may be that significantly less material is used than if a non-planar carrying member is utilized. Additionally, the planar carrying member may be mass produced and fitted to a number of different fuel system components, lowering the cost thereof. Where the fuel system components have a housing comprising a top surface adapted to attach to the planar carrying member, such construction may be significantly cheaper than if a fusion melting element was integrated into the fuel system component at the time of manufacture of the housing, due to the simplicity of the shape of a planar member as compared with a housing of such component.

The fuel system component may be connected to at least one additional fusion melting element. The fuel system component may further comprise an outlet nozzle adjacent the top surface.

According to yet a further aspect of the present invention there is provided a planar weldable carrying member comprising an upper surface, an opposing lower surface, and a fusion melting element attached thereto. The planar weldable carrying member may have any of the features described above.

According to still another aspect of the present invention there is provided a fuel tank made of a plastic material and fitted with at least one fuel system component attached to an inside surface of a wall thereof, wherein the fuel system component comprises a housing having a top surface adapted to be pre-fitted with a fusion melting element and the fuel system component is attached to a predetermined site at the inside surface by fusion welding. The fuel system component and a planar weldable carrying member, where such exists, in accordance with this aspect may have any of the features described above.

The following features may be applicable to any of the above aspects of the invention:

A) The fusion melting element may be fitted or pre-fitted in either one of the housing of the fuel accessory or the wall site of the fuel tank. Alternatively, the fusion melting element may be separately disposed in-between the housing of the fuel accessory and the wall site of the fuel tank. It may also be received within a weldable carrying member, e.g. embedded within a disc-like member disposed between the housing of the fuel accessory and the wall site of the fuel tank, whereby heating the fusion melting element results in melting the carrying member to weld at both faces thereof and form the attachment.

B) The fusion melting element is a filament formed in a coiled or undulating pattern, possibly embedded within a groove of a corresponding shape. However, the fusion melting element may also be in the form of a sheet assuming different shapes, e.g. a disc-like element, a flat ring element, etc.

C) The fusion melting element is activated by an electric current applied thereto through conductive wires extending from the fusion melting element. Typically said wires are easily detachable from the fusion melting element.
D) The fusion melting element is activated by an electric current applied thereto via induction.
E) One of the fuel accessory and the site at the fuel tank may be fitted with a magnetizable member, whereby during the fusion welding process the fuel accessory is attracted to the site at the fuel tank by a magnetic force. The inductive current may be used also for generating the magnetic field for attracting and engaging the fuel accessory to the wall site and for fusion welding thereof.
F) The fusion melting element is activated by an electric current applied thereto through conductive elements engageable by corresponding current sockets of a fuel accessory applicator.
G) The fuel accessory is introduced to the site of the fuel tank and is supportably retained during the fusion welding process by a fuel accessory applicator, which according to one embodiment is in the form of a manipulator configured as an arm for introducing into an interior space of the fuel tank through an opening formed in the tank. According to other embodiments, the manipulator is in the form of device suited for supporting the fuel accessory and position it against the wall site with suitable electric supply arrangements, with another portion of the device suited for bearing against an opposed wall portion of the fuel tank. Optionally, the manipulator comprises an electric socket for connecting to a corresponding socket of the fuel accessory to apply thereby electric current.
H) The fuel accessory may be any one or more element of a variety of such elements fitted within a fuel tank, e.g. valves of different types (vent valves, roll-over valves, over filling intermitting valves, etc), fuel traps, gauges, filters, etc. and also a seating/carrier attached to the fuel tank and which in turn various valve members are attached thereto.
I) At least a top portion of a housing of the fuel accessory and the wall site portion of the fuel tank are made of a suitable plastic material (e.g. Polyethylene—PE) which is heat weldable, to thereby qualify for fusion welding.
J) It is an option that the fuel accessory be engaged with the wall surface of the tank using a pressure sensing arrangement, e.g. a strain gage or a micro-switch, to ascertain that the fuel accessory is tightly and properly engaged with the wall of the fuel tank.
K) A control assembly may be provided for governing several welding parameters and also for controlling multiple fusion welding attachments, e.g. simultaneous welding of several fuel accessories or of a seating/carrier attached to the fuel tank and which in turn various valve members are attached thereto.

The present invention may provide a method for attaching a fuel element to a wall site at an inside surface of a fuel tank by fusion welding, and further to provide a fuel accessory and a fuel tank suitable for such attachment, as well as a method for carrying out such attachment, and a devise useful for the method.

While the invention will be described hereinafter in the detailed description with reference to a fuel valve, it will be appreciated that it is not intended to limit the scope of the invention to that embodiment, but rather, to cover all modifications and embodiments as may fall within the scope and the spirit of the invention, and as defined in the claims.

BRIEF DESCRIPTION OF THE DRAWINGS

In order to understand the invention and to see how it may be carried out in practice, several embodiments will now be described, by way of non-limiting examples only, with reference to the accompanying drawings, in which:

FIG. 10A is a schematic side view of the weldable carrying member and fusion melting element in FIGS. 9A-9J pre-fitted to a fuel system component;

FIG. 10B is a schematic perspective view of the weldable carrying member, fusion melting element and fuel system component in FIG. 10A;

FIG. 11A is a schematic side view of the weldable carrying member and fusion melting element in FIGS. 9A-9J pre-fitted to another fuel system component;

FIG. 11B is a schematic perspective view of the weldable carrying member, fusion melting element and fuel system component in FIG. 11A;

DETAILED DESCRIPTION OF THE INVENTION

Figure 1A:
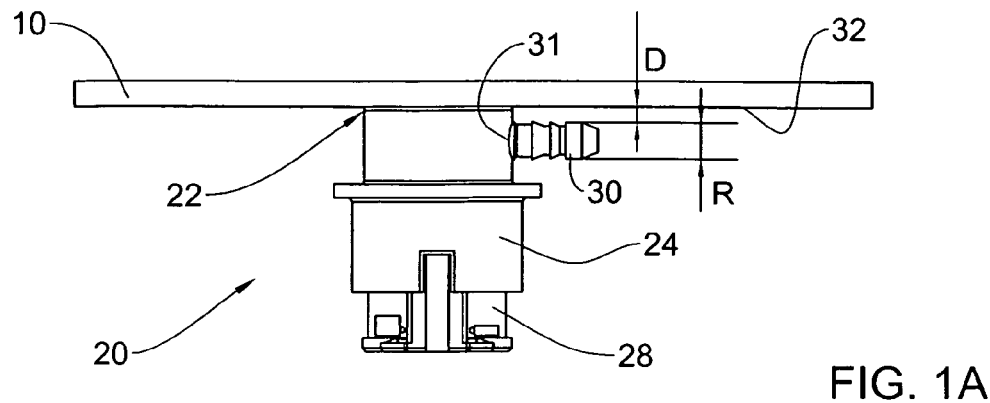
FIG. 1A is a side view of a portion of a fuel tank at an area of the tank fitted with a fuel valve, attached thereto by fusion welding.

Attention is first directed to FIG. 1A illustrating a top wall portion 10 of a fuel tank (not seen in whole) made of a thermoplastic material with a fuel accessory, namely roll-over valve generally designated 20 attached thereto at a wall site designated 22.

Hereinafter in the drawings and description, reference will be made to a fuel accessory which is in the form of a valve though, one should appreciate that the term fuel accessory should be understood in its broadest meaning, referring to, among others, different types of valves, liquid traps, gauges, filters etc., as well as carriers attached to the fuel tank and which in turn bear valve members etc.

In the present examples, the fuel accessory 20, is a roll-over valve comprising a housing 24 made of a thermoplastic material and a snap-type closure member 28 retaining in place the valve's components.

It is further noticed in FIG. 1A that no connecting means are required for attaching the valve to the fuel tank's wall portion 10, whereby the effective dead space, namely the space between maximum fuel level and the top wall of the tank is retained to a minimum and further whereby the outlet nozzle 30 extends right adjacent below the bottom surface 32 of the top wall 10 of the fuel tank. In the present example the outlet nozzle 30 has a maximal radius R, of about 8 mm, and is spaced a minimum distance D, of about 2 mm, from the bottom surface 32 of the wall portion 10. The outlet nozzle 30 is designed to be fitted with a tube (not shown) having a wall thickness of 1 mm, and thus there will remain a safety gap of 1 mm between the bottom surface 32 of the wall portion 10 and the tube, when fitted to the outlet nozzle 30. It will be appreciated that the safety distance may vary somewhat, however the present invention allows the dead space to be reduced to a few millimeters by allowing a portion 31 of the outlet nozzle 30 which engages the housing 24 to be adjacent to the wall portion, i.e. being positioned less than a centimeter apart. It should also be noted that no apertures are formed at the fuel tank's walls and thus fuel vapor is retained to a minimum.

Figure 1B:
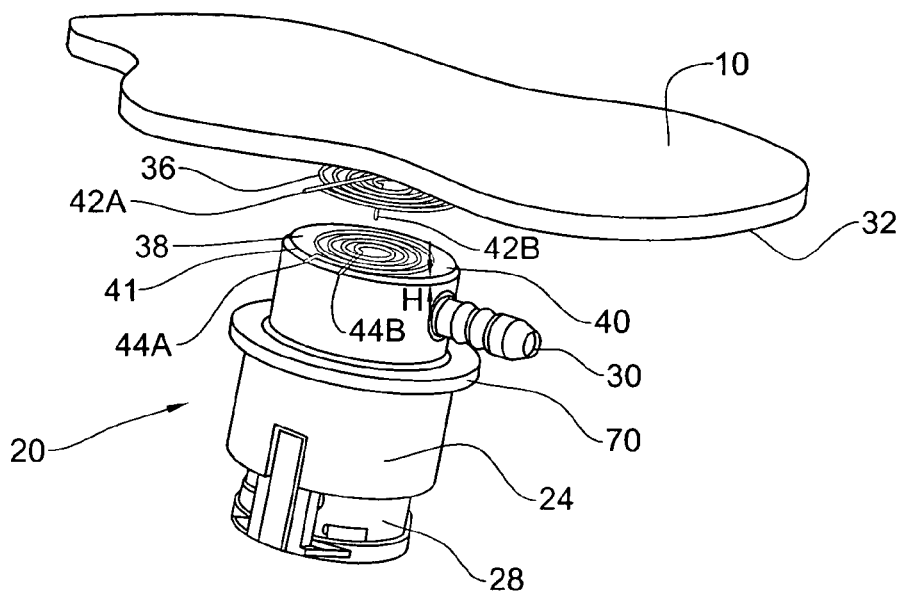
FIG. 1B is an exploded isometric view of the assembly seen in FIG. 1A.

Referring also to FIG. 1B as already mentioned, the valve 20 is attached to the fuel tank's top wall 10 by fusion welding, facilitated by a coiled fusion melting element 36, which in some of the particular illustrated embodiments is accommodated within a corresponding coiled path 38 constituted by grooves formed in a top engaging surface 40 of the valve 20. The grooves 38 are of sufficient size to allow the fusion melting element 36 to be placed therein. The top surface 40 comprises plastic material 41 of a height H sufficient to allow attachment of fuel system component to the fuel tank by melting of the plastic material 41, without damaging the fuel accessory 20. The height H is of a magnitude of about 1.5 mm.

The fusion melting element 36 is thus pre-fitted to the top surface 40 of the housing 24 by placement thereof in the grooves 38.

It should be understood that the 1.5 mm height of plastic material for fusion welding may not be fully obtained from the top surface 40, but may alternatively be partially or fully obtained from the bottom surface 32 of the fuel tank's wall portion 10, where the design of such is sufficiently thick so as not to be damaged due to the welding.

It is noticed that the top engaging surface 40 has a contour corresponding with that of the wall site which, in the present case, is flat, so as to ensure adequate contact surface.

Figure 2A:
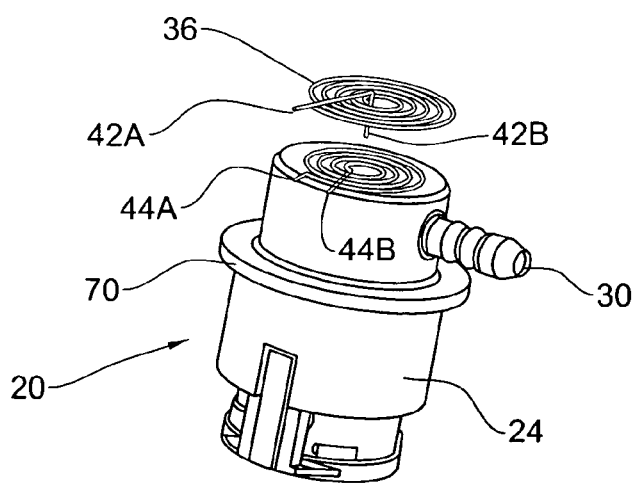
FIG. 2A is a top isometric view of an embodiment of a fuel valve according to the present invention.

It is further noticed in FIGS. 1B and 2A that the coiled fusion melting element 36 has two conductive leg members 42A and 42B, respectively, for applying to the coiled filament an electric current. The housing 24 of valve 20 is fitted at an upper portion thereof with grooves 44A and 44B, through which the conductive legs project, whereby the conductive leg portions may then be engaged by conductive wires or other conductive means as will be discussed hereinafter.

Figure 3A:
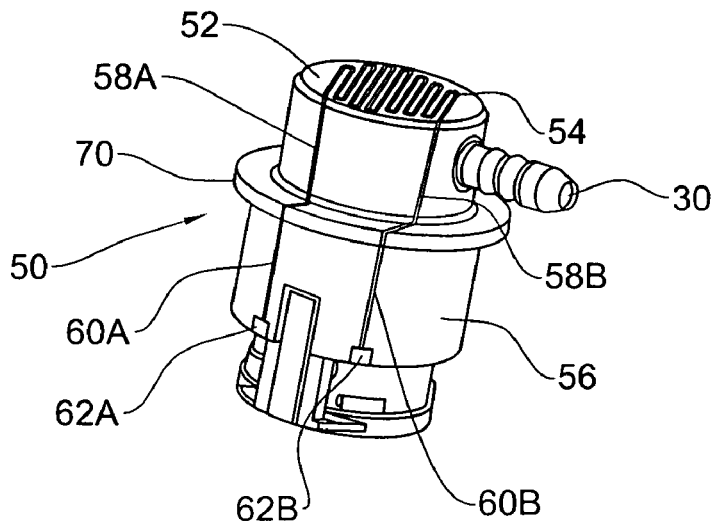
FIGS. 3A and 3B are top isometric views of fuel valves according to other embodiments of the invention.
Figure 6A:
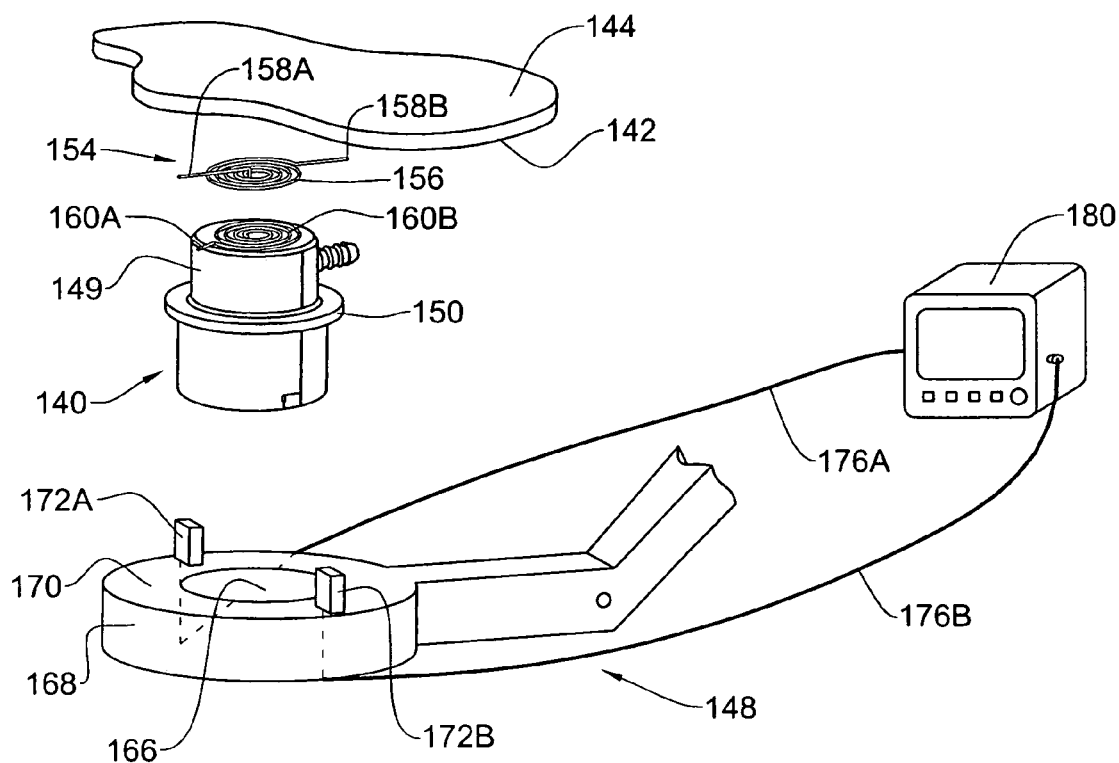
FIGS. 6A to 6D are schematic representations of fusion welding process according to different embodiment of the present invention.

In FIG. 3A there is illustrated a valve generally designated 50 wherein the fusion melting element 52 is in the form of an undulating filament received within a corresponding groove 54 formed at a top wall portion of the valve housing 56, with conductive leg portions 58A and 58B extending through corresponding grooves 60A and 60B formed along a portion of the housing 56 and extending to electric sockets 62A and 62B, respectively, for engagement with a current applicator, as will be explained hereinafter with reference to FIG. 6A.

Figure 3B:
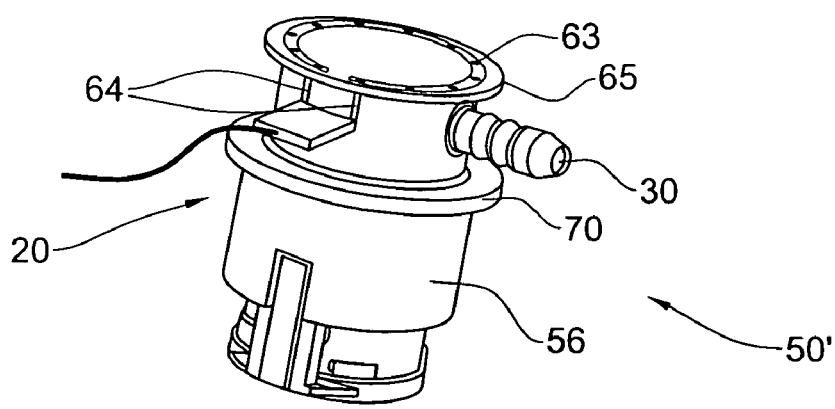

FIG. 3B is directed to a valve 50' similar to that disclosed in connection with FIG. 3A above, with the exception that the fusion melting element 63 is in the form of an open rink-like sheet of conductive material extending along foundries of the housing, and engageable with a current supply source via legs 64 projecting through a peripheral portion 65 of the housing. It is however appreciated that other shapes of a fusion melting element are possible also at sheet form.

Figure 3C:
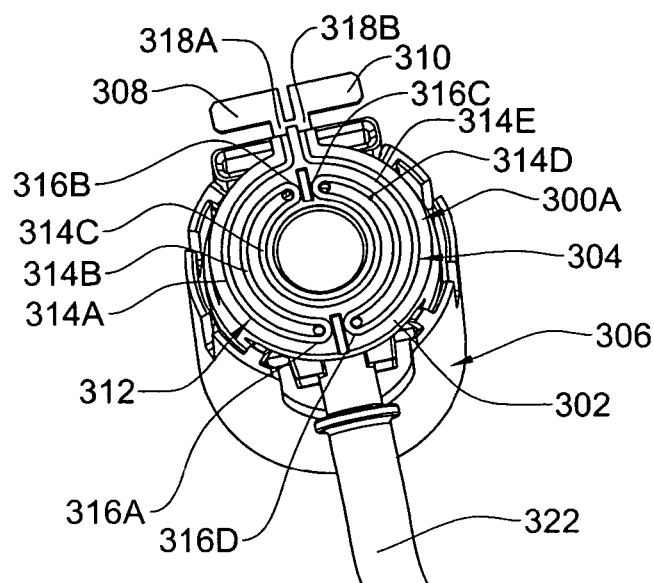
FIG. 3C is a top perspective view of a fuel system component and a fusion melting element according to another embodiment of the invention.

For example FIG. 3C shows a further shape for a fusion melting element 300A in a sheet form disposed on an engagement face 302 fastened to a top portion 304 of another roll over valve generally designated as 306 via a bonding agent. The fusion melting element 300A comprises a first conductive end 308, a second conductive end 310, and an elongated conductive portion 312 extending therebetween. The first and second conductive ends (308,310) are each in the form of a thin plate extending parallel with the engaging surface 40. Notably, the connection between the first and second conductive ends (308,310) and the elongated conductive portion 312 is relatively weak, for which purpose will be explained hereinafter. The elongated conductive portion 312 is constituted by a plurality of large C-shaped sub-portions (314A, 314B, 314C, 314D, 314E) connected in series by a plurality of small C-shaped sub-portions (316A, 316B, 316C, 316D), and two linear portions (318A, 318B) extending between an end point of large C-shaped sub-portion 314A and the first conductive end 308, and an end point of large C-shaped sub-portion 314E and the second conductive end 310, respectively.

It will be appreciated that the shape of the fusion melting element in FIG. 3C may be secured to the fuel system component in any known manner, e.g. by being fitted to grooves formed in a top surface of the fuel system component. Additionally, the fusion melting element may also be in a non-sheet form. The fusion melting element 300A, may be used on other types of fuel accessories, as seen, for example in FIG. 3D on a fuel limit vent valve, generally designated 320, with the fusion melting element thereof designated 300A.

Figure 3D:
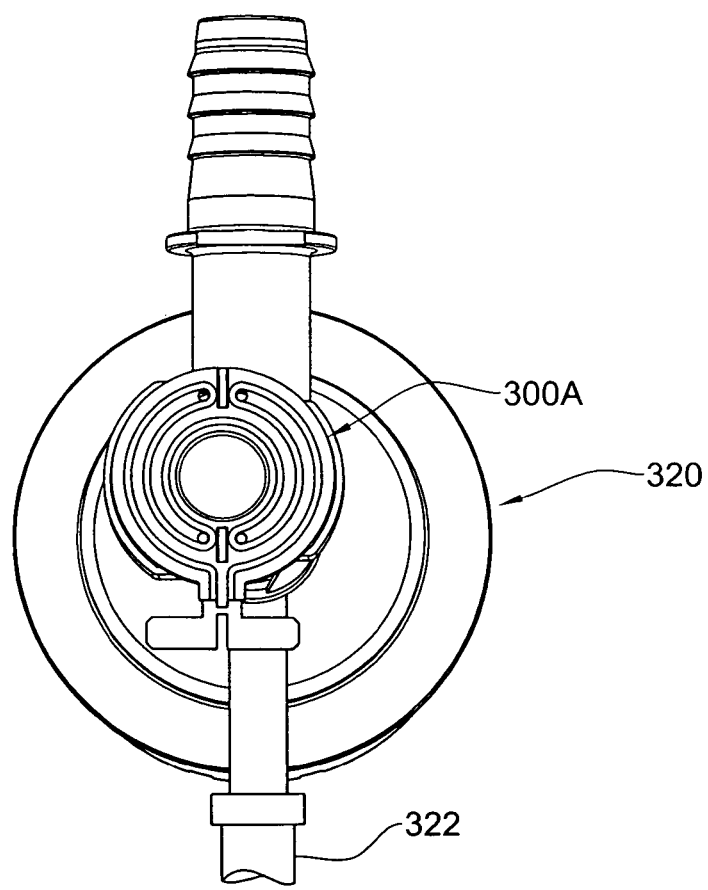
FIG. 3D is a top perspective view of yet another fuel system component with the fusion melting element of FIG. 3C.
Figure 3E:
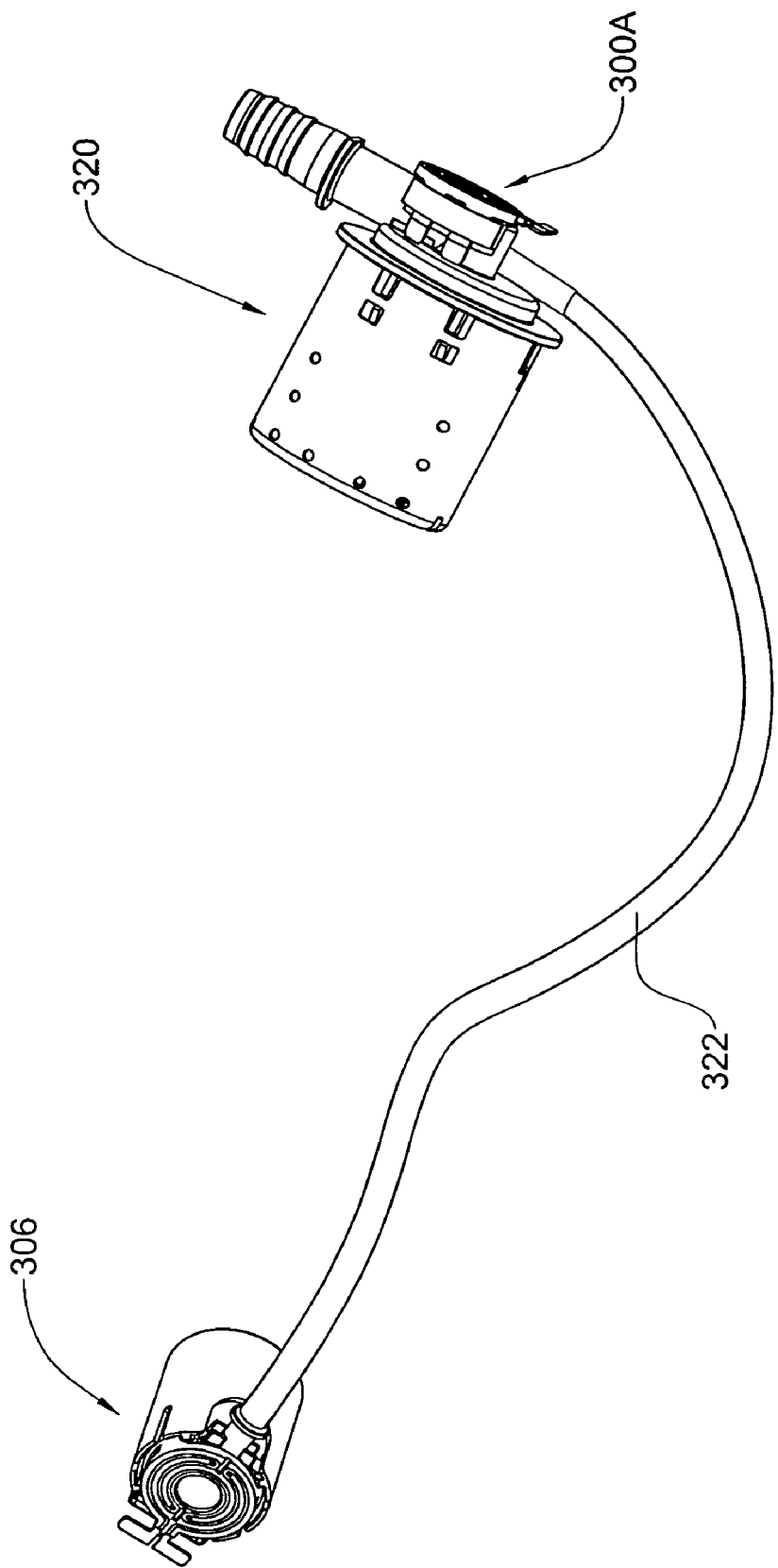
FIG. 3E is a top perspective view of the fuel system components and fusion melting elements in FIGS. 3C and 3D.

Turning attention briefly to FIG. 3E, it can be seen that the roll over valve 306 and the fuel limit vent valve 320 can be pre-fitted with a fusion melting element 300A and connected in fluid contact with each other via a tube 322 before insertion thereof into a fuel tank. Thus the elements (306,320) shown in FIG. 3E may be inserted into a fuel tank and welded thereto simultaneously.

It is further noticed that the housing (24 in FIGS. 1 and 2A and 56 in FIG. 3) is fitted with a annular projecting shoulder 70, the purpose of which will become apparent hereinafter with reference to FIGS. 6A and 6B.

Figure 2B:
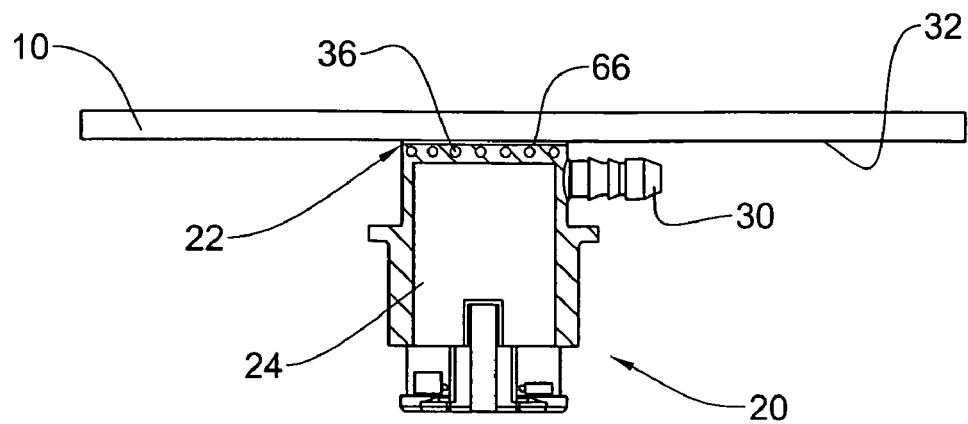
FIG. 2B is a longitudinal section through the fuel valve and the wall site seen in FIG. 1A.

In the illustration of FIG. 2B it can be seen how the valve 20 is welded at the wall site 22 of the bottom surface 32 of a top wall 10 of a fuel tank by fusion welding at 66. Fusion welding is carried out by applying an electric current through the fusion melting element, namely metal coil 36 to thereby heat the thermoplastic material to a temperature above its melting point whilst retaining the valve 20 against the surface 32 and allowing the molten material to cool down, whereby welding is obtained.

Different parameters govern the fusion welding process, e.g. thickness and intensity of the filament of the fusion melting element, pattern and intensity of the coils or undulants, depth of accommodating groove within the respective element, type of plastic material, size of weldable portion, and the magnitude of the electric current applied through the fusion melting element. Furthermore, depending on the shape and size of the fuel accessory, one or more fusion welding focuses may be applied, i.e. in case of a large carrier member, several welding sites may be performed. Further attention is now directed to FIG. 4 in which there is illustrated an embodiment of fuel valve 76 in accordance with another embodiment, fitted at a top portion of the housing 78 with a coiled fusion melting element 80 and below there is provided a metallic member 82 (a disc in the represent example) embedded within the top portion of the housing 78. The arrangement is such that during the fusion welding process electric current to the fusion melting element 80 is excited by induction applied via an inductive coil member 86, generating also a magnetic force acting on the disc 82, so as to attract the entire housing 78 into tight engagement with the bottom surface 90 of the top wall portion 92 of the fuel tank.

Figure 4:
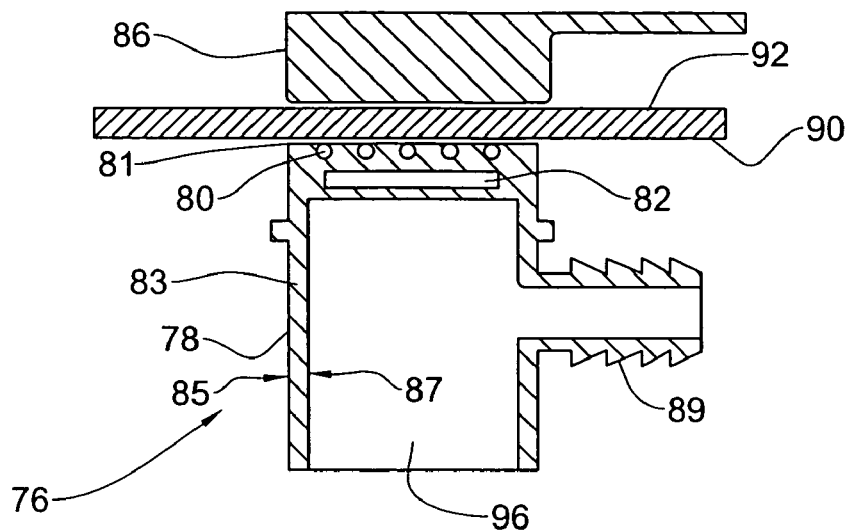
FIG. 4 is a schematic sectional side view of a portion of a fuel tank during fusion welding thereto of a fuel valve according to an embodiment of the invention.

While such is true for other examples described in the specification, the internal view in FIG. 4 of a fuel system component, allows visualization of how a housing, in this example designated 78, is pre-fitted with a fusion melting element 80 at a top surface 81 thereof, and comprises only a single side wall 83 extending from the top surface 81 thereof. The side wall 83 being a single-layered wall having an outer surface 85 in fluid communication with a fuel tank and an inner surface 87 in fluid communication with an inner space 96 of the fuel system component. The inner space 96 is used for facilitating conveyance of gas to the outlet nozzle 89 and therefore being an example of a functional component of the fuel system component.

In accordance with a modification of this embodiment (not shown), the disc 82 is not embedded within the housing 78 of the fuel accessory but is rather fitted within the space 96 of the valve and may then be removed after completing the fusion welding process.

Figure 5A:
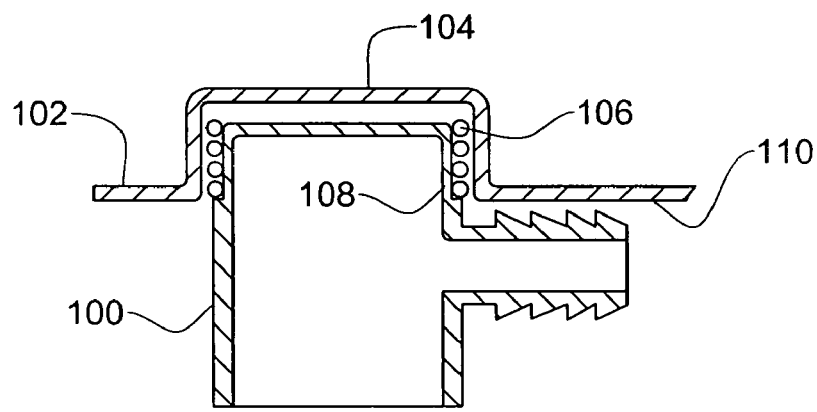
FIG. 5A is a schematic sectioned side view of a portion of a fuel tank with a fuel valve attached thereto, according to another embodiment of the invention.
Figure 5B:
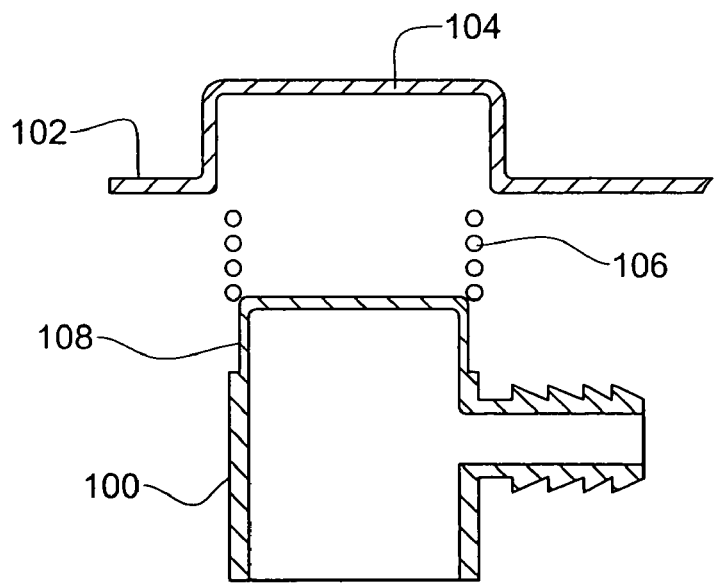
FIG. 5B is an exploded sectional side view of the assembly of FIG. 5A.

The embodiment illustrated in FIGS. 5A and 5B differs from the previous embodiments in the general configuration of the fuel accessory, i.e. valve 100, and further the top wall portion 102 of the fuel tank is formed with a protruding valve receiving formation 104 fitted for snugly receiving a top portion of the housing of valve 100, thereby making it unnecessary to support the valve during the welding process.

In this embodiment, the fusion melting element is a coiled filament 106 coaxially extending about the top portion 108 of the housing of the valve 100. Optionally, the top portion 108 is formed with a corresponding coiled path (not shown) for receiving the fusion melting element 106.

The arrangement disclosed in FIGS. 5A and 5B ensures a minimal deadspace between the bottom surface 110 of the top wall 102 of the fuel tank and the maximum fuel level within the valve 100.

FIG. 6A illustrates a process for fusion welding of a fuel accessory designated 140 to a bottom surface 142 of a top wall portion 144 of a fuel tank, using a manipulator 148.

The fuel accessory 140 corresponds with the valve 20 of FIGS. 1B and 2A and comprises a housing 148 formed with an annular shoulder 150 and a coiled path 154 receiving a coiled fusion melting element 156 with its conductive legs 158A and 158B laterally projecting through grooves 160A and 160B formed at a top portion of housing 148.

During the fusion welding process, the valve 140 is placed within a receptacle 166 of a fuel accessory applicator 168 of manipulator 148.

In operation, the manipulator arm is introduced through an opening formed in the fuel tank (typically a fuel pump aperture formed in the tank or any other suitable such opening) with the valve 140 received within the receptacle 166 with the annular shoulder 150 bearing against the top surface 170 of the applicator and whilst the conductive leg portions 158A and 158B engage electric sockets 172A and 172B of the manipulator 148, in turn connected by suitable conductive wires 176A and 176B, respectively, to a power supply 180. It should be appreciated that the conductive wires 176A and 176B may also be integrated with the manipulator 148 and may also be internal thereto.

Upon applying the top surface of the valve housing 148 to the bottom surface 142 of the top wall 144 of the fuel tank, an electric current is applied through sockets 172A and 172B to conductive legs 158A and 158B, respectively, of the fusion melting element 156, whereby heat is generated at the coil, until the plastic material melts. Then, the current ceases to allow cooling down of the molten plastic material, whereby fusion welding is obtained.

Figure 6B:
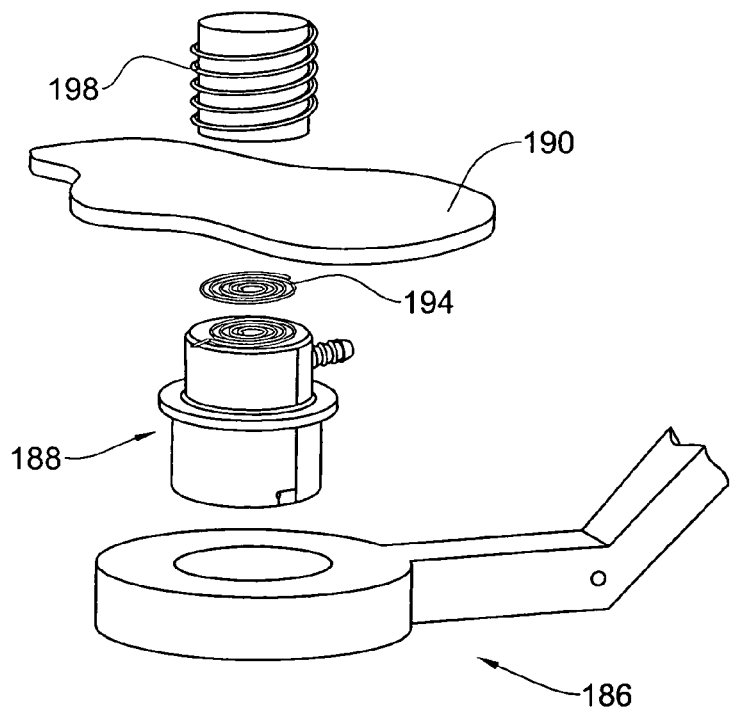

In the embodiment of FIG. 6B, the manipulator 186 is similar to that seen in FIG. 6A with the exception that it is not used to apply an electric current, but rather to position the valve 188 at the appropriate wall site of the top wall 190 of the fuel tank and apply moderate pressure during the fusion welding process. However, in this particular example, the fusion melting element 194 is heated by a current applied thereto via induction, applied by an external induction coil 198.

In both the embodiments of FIGS. 6A and 6B, the manipulator 148 and 186, respectively, is removed after cooling down of the fusion welded zone.

Figure 6C:
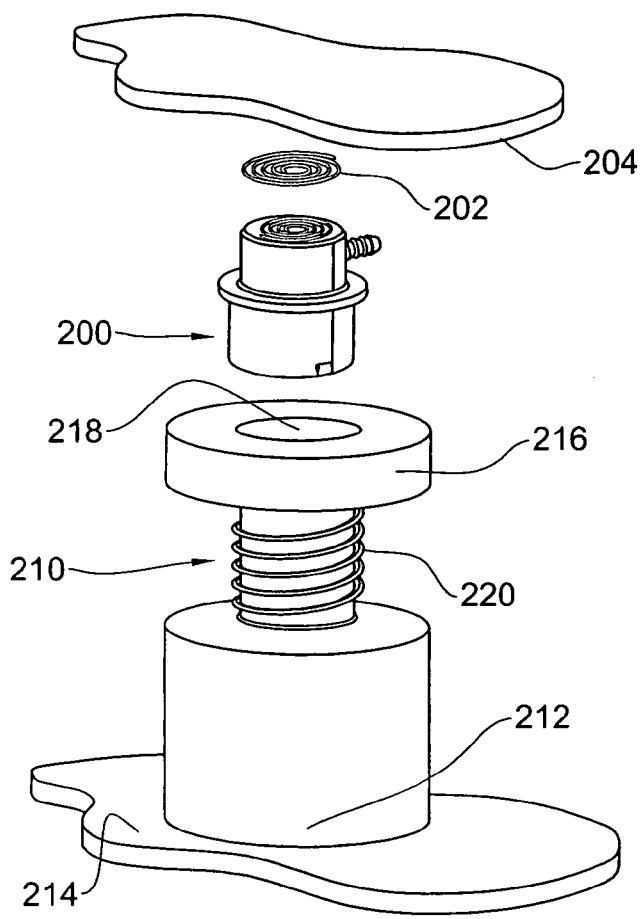

Turning now to FIG. 6C there is illustrated a fuel valve generally designated at 200, fitted with a fusion melting element 202, as disclosed according to any of the embodiments according to the invention. In order to correctly position the valve 200 at the welding site and to ensure proper surface contact with the inner wall surface 204 of the fuel tank, a piston assembly 210 is provided, wherein one end thereof 212 bears against a bottom wall 214 of the fuel tank and an upper retractable member thereof 216 is fitted with a valve receptacle 218 and appropriate current conducting means (not shown). The arrangement is such that the upper member 216 is spring biased by a coiled spring 220, so as to apply axial force to the valve 200, so that during the welding process it properly engages the inner wall surface 204 of the tank. The piston assembly may be operated by different means such as, for example, electromagnet, hydraulic, pneumatic, etc.

Figure 6D:
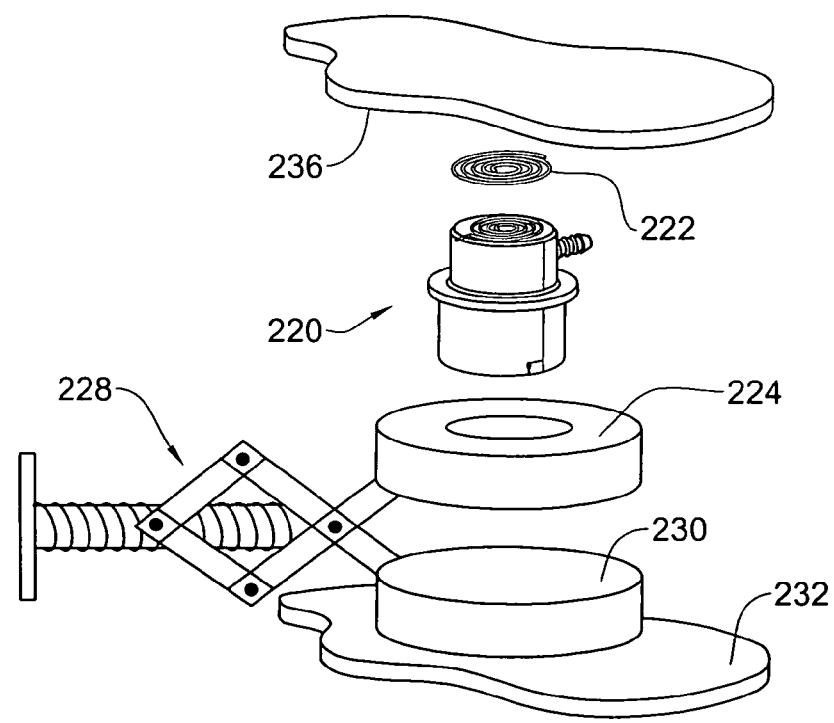

In the embodiment of FIG. 6D the valve 220 with the associated fusion melting element 222 are received within a receptacle 224 of a extendable 'scissors type' mechanism 228, wherein one leg portion has a support member 230 bearing against a bottom wall portion 232 of the fuel tank and whereby retracting the leg portions of the mechanism entails vertical displacement of the receptacle 224 for positioning the valve 220 flush against an inner wall surface 236 of the fuel tank, whilst applying suitable force, whereby applying an electric current to the fusion melting element entails fusion welding, as discussed hereinabove.

Figure 7:
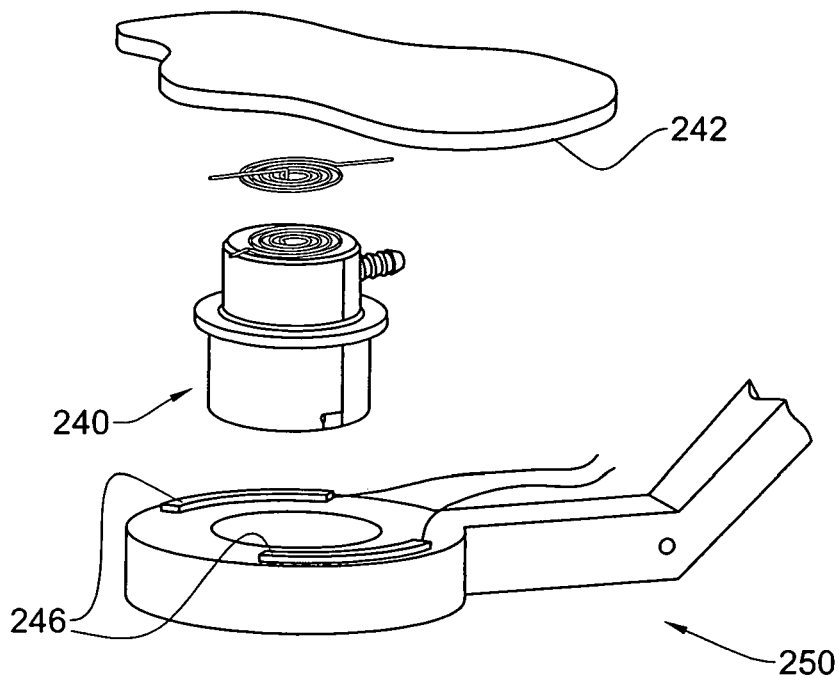
FIG. 7 illustrates a modifications of the present invention, wherein engagement pressure control arrangements are provided.

Further reference is now directed to FIG. 7. In order to ascertain that during the fusion welding process the fuel accessory, e.g. a valve 240, is properly and tightly engaged with a corresponding wall portion 242 of the fuel tank, there may be provided pressure indicators 246 e.g. in the form of strain gages or micro-switches, which in the present embodiment are mounted on the end of the manipulating arm 250. Such pressure indicating means or sensors may however be mounted at other locations thereof.

Figure 8:
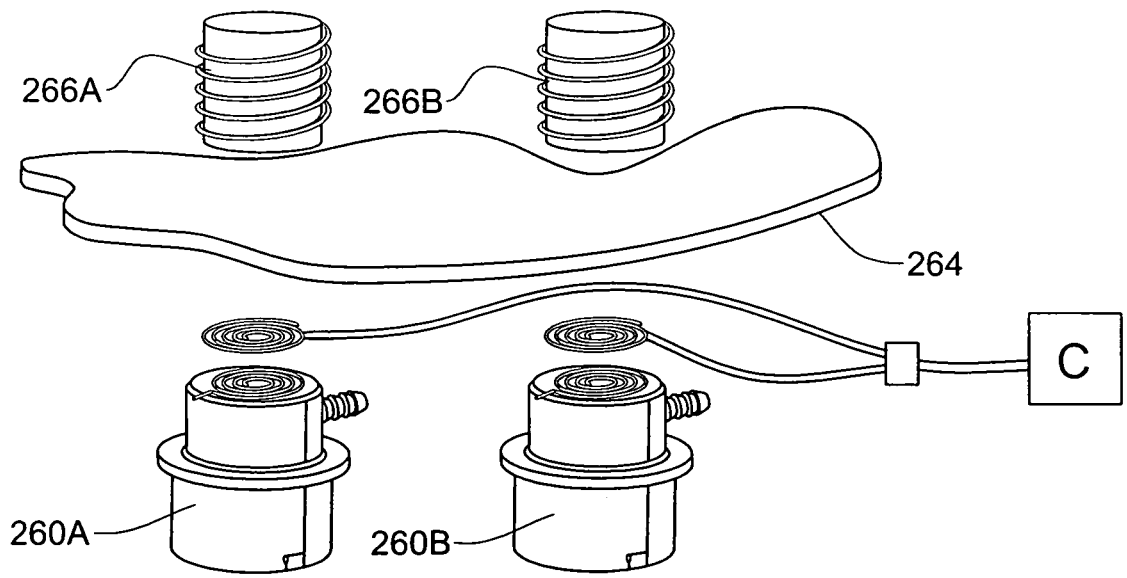
FIG. 8 is a schematic representation illustrating simultaneous assembly of two valves within a fuel tank.
Figure 9A:
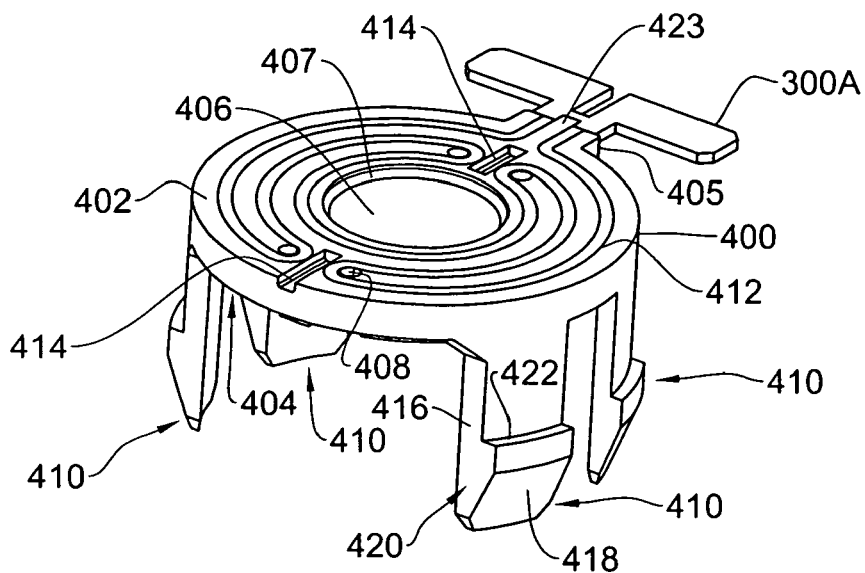
FIG. 9A is a schematic perspective view of a planar weldable carrying member and fusion melting element.
Figure 9B:
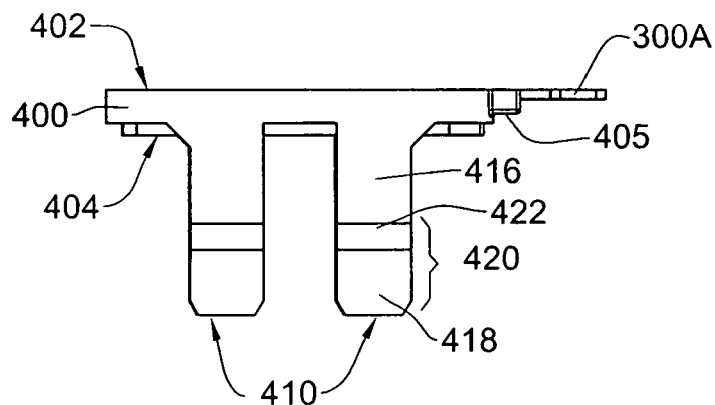
FIG. 9B is a schematic side view of the planar weldable carrying member and fusion melting element in FIG. 9A.
Figure 9C:
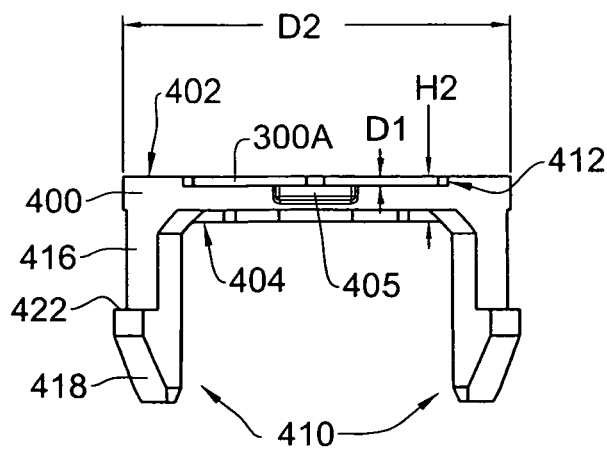
FIG. 9C is a schematic front view of the planar weldable carrying member and fusion melting element in FIGS. 9A and 9B.
Figure 9D:
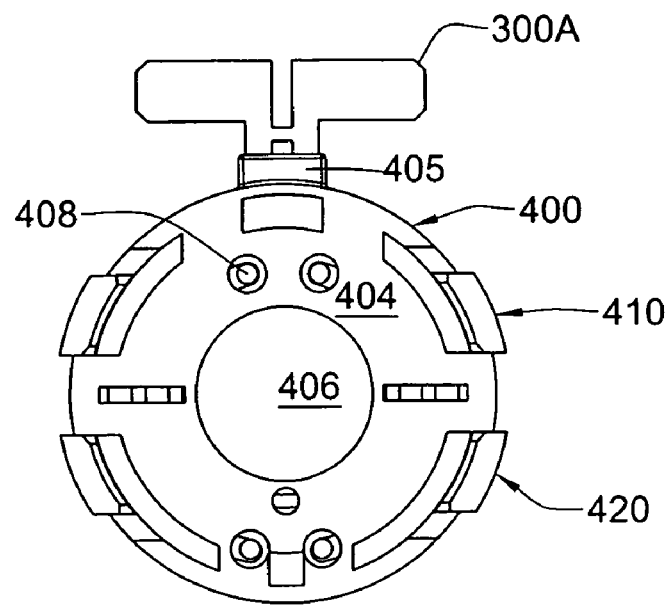
FIG. 9D is a schematic bottom view of the planar weldable carrying member and fusion melting element in FIGS. 9A-9C.
Figure 9E:
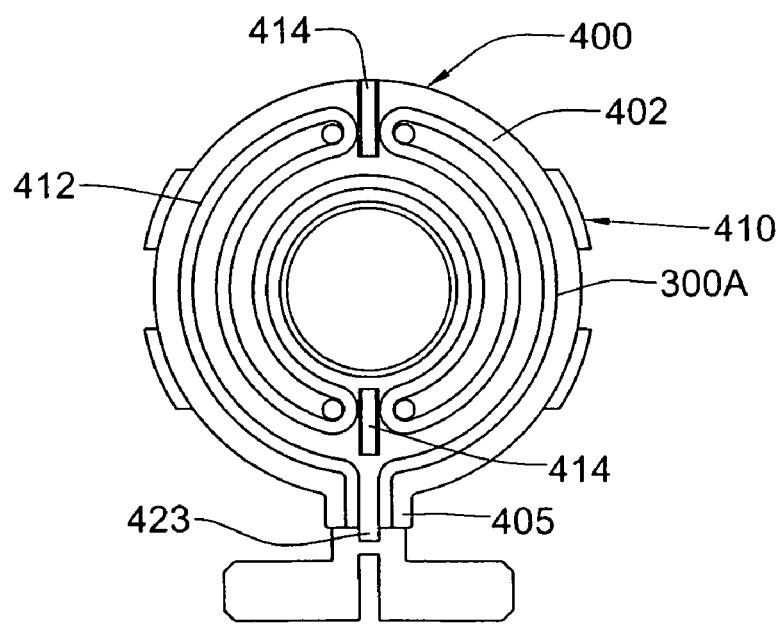
FIG. 9E is a schematic top view of the planar weldable carrying member and fusion melting element in FIGS. 9A-9D.
Figure 9F:
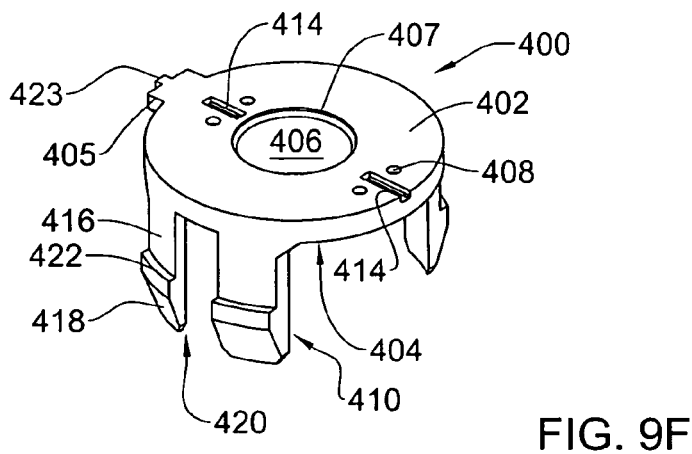
FIG. 9F is a schematic perspective view of the planar weldable carrying member in FIGS. 9A-9E.
Figure 9G:
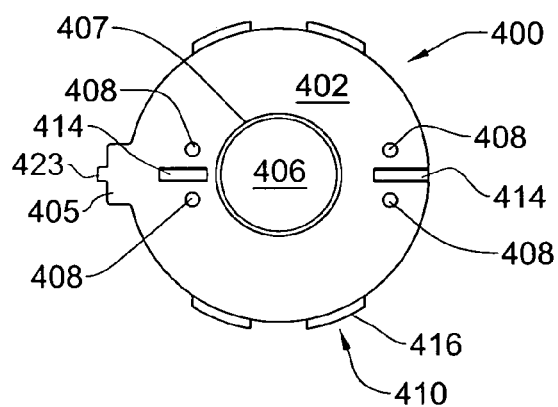
FIG. 9G is a schematic top view of the planar weldable carrying member in FIGS. 9A-9F.
Figure 9H:
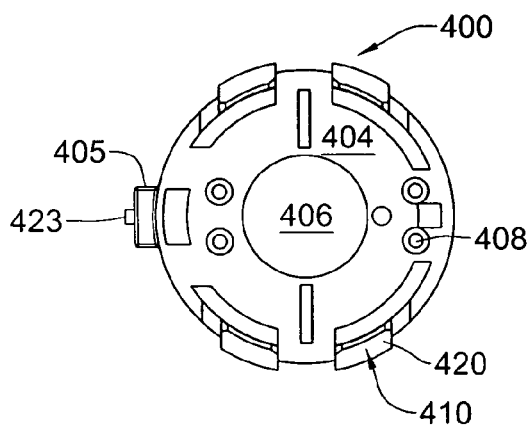
FIG. 9H is a schematic bottom view of the planar weldable carrying member in FIGS. 9A-9G.
Figure 9I:
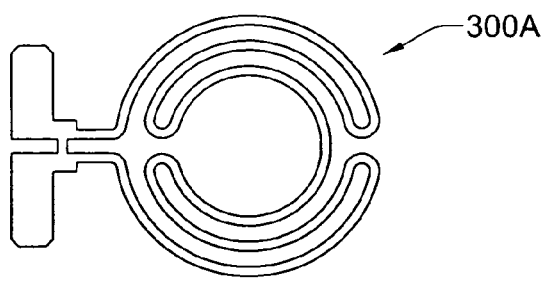
FIG. 9I is a schematic perspective view of the fusion melting element in FIGS. 9A-9E.
Figure 9J:
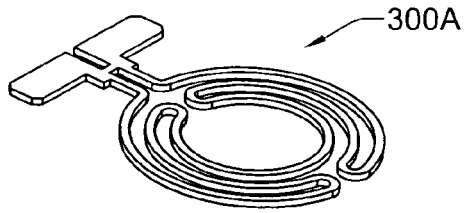
FIG. 9J is a schematic top view of the fusion melting element in FIGS. 9A-9E.

The illustration of FIG. 8 exemplifies how two fuel accessories, namely valves 260A and 260B are simultaneously fitted to an inner wall surface 264 of a fuel tank. The arrangement is such that two inductive coil members 266A and 266B are positioned in register with the welding location of the corresponding valves 260A and 260B, and further there is provided a controller C for simultaneously applying current to the inductive coil members 266A and 266B and the valves 260A and 260B. It is appreciated that this arrangement is suitable also for a large fuel accessory (rather then separate valves), e.g. in the case of a carrier member attached to the fuel tank's inner wall, with respective fuel accessories attached in turn to said carrier.

According to another alternative, the fusion melting element may also be received within a planar weldable carrying member. Such planar weldable carrying member may be disposed between the housing of the fuel accessory and the wall site of the fuel tank and welded to a wall site of the fuel tank.

In FIGS. 9A-9J, there is shown a fusion melting element 300A, the description of which is detailed with reference to FIGS. 3C-3E, which is attached to an example of a planar weldable carrying member, generally designated as 400.

The planar carrying member 400 has a planar shape and comprises an upper surface 402, an opposing lower surface 404, and a lateral seat projection 405. The member 400 is formed with a plurality of grooves and apertures 408 for attachment of the fusion melting element thereto, and a central circular aperture 406 having a inwardly slanted edge 407. The carrying member 400 in this example is formed with four snap-lock members 410 extending from the lower surface 402 in a direction perpendicular thereto, for attachment thereof to a fuel system component 424 (FIG. 10).

The plurality of grooves include curved grooves 412 (FIGS. 9A, 9C and 9E; not shown in FIGS. 9F and 9G for ease of explanation) having a depth D1 of about 0.8 mm (FIG. 9E) which match the shape of the fusion melting element 300A such that it can be seated therein, and linear grooves 414 for separating adjacent portions of the fusion melting element 300A. The apertures 408 may have fastening elements (not shown) inserted therethrough to hold portions of the fusion melting element 300A in place.

Each snap lock member 410 is formed with a resilient bendable linear portion 416 having an outwardly slanted surface 418 at a distal end 420 thereof and a step 422 formed between the slanted outer surface 418 and the linear portion 416.

The lateral seat projection 405 comprises a positioning element 423 of a size corresponding to the two linear portions (318A, 318B), for facilitating the fusion melting element 300A to be seated on the lateral seat projection 405 in a stable manner.

The height H2 of this example planar member 400 (not including the snap lock members) is about 3.8 mm and the largest diameter D2 is about 33.6 mm.

Turning to FIGS. 10A and 10B, the planar carrying member 400 and fusion melting element 300A attached thereto, are shown fitted to a valve 430 comprising a top surface 432. The top surface of the valve is adapted to be pre-fitted with the fusion melting element 300A by being formed with outwardly directed projections (not seen) adapted to snappingly engage the snap lock members 410 of the planar carrying member 400. Once the planar carrying member 400 is pre-fitted to the valve 430, they are inserted into a fuel tank (not shown) and welded thereto, after which the cords (not shown) attached to the first and second conductive ends (308,310) are pulled out of the fuel tank, snapping off the ends (308,310) with the help of the positioning element 423. It may be noted that the top surface 432 of the valve 430 comprises a diameter only slightly greater than the diameter of the planar carrying member 400.

By contrast, turning to FIGS. 11A and 11B, the planar carrying member 400 and fusion melting element 300A attached thereto, are shown fitted to a valve 440 having a top surface 442 of a far greater diameter than that of the planar carrying member 400.

Figure 12:
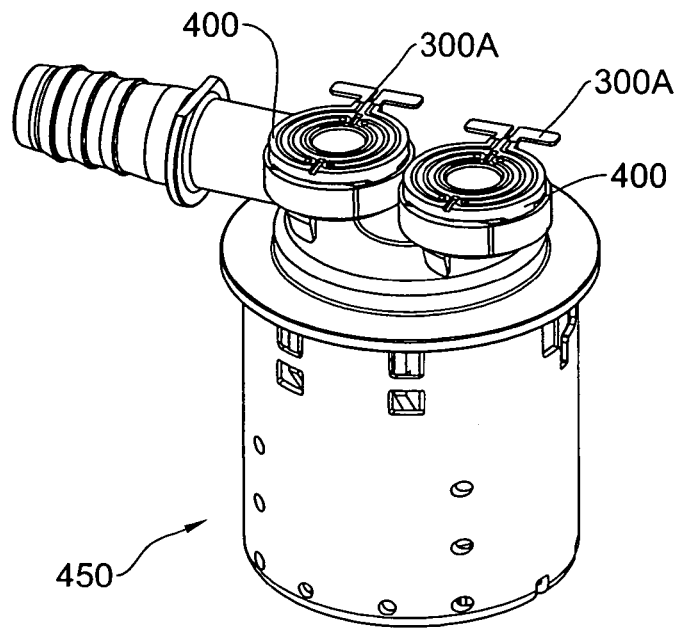
FIG. 12 is a schematic perspective view of two weldable carrying member and fusion melting elements of the type shown in FIGS. 9A-9J pre-fitted to a fuel system component.

With reference to FIG. 12, a fuel system component 450 is shown pre-fitted with two planar carrying members 400 each having a fusion melting element 300A attached thereto. While the fusion melting elements of the type described are adapted to create a very strong bond between a fuel system component and a fuel tank, the option to attach more than one fusion melting element to a fuel system component may be utilized where an especially strong bond is a requirement (for example, strength requirements for attachment of a valve may be 400N in one region and 1000N in another).

Figure 13:
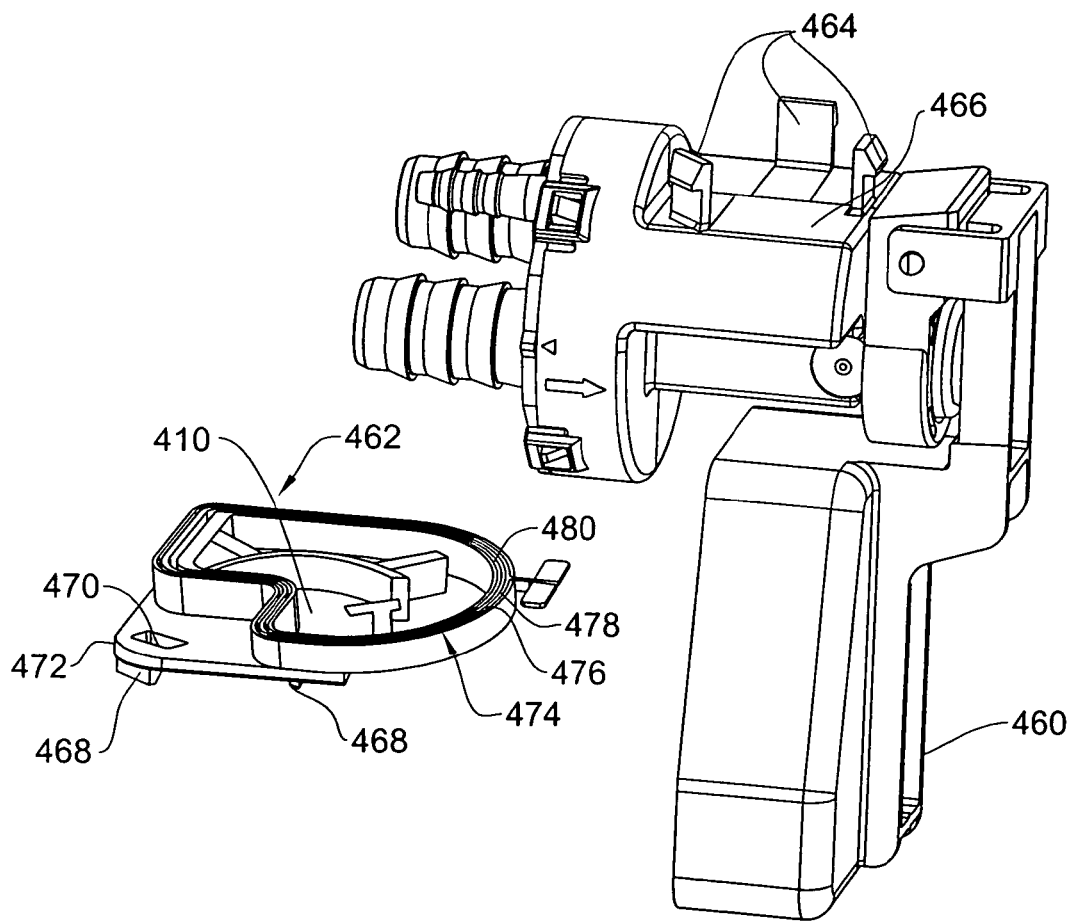
FIG. 13 is a schematic side view of anther weldable carrying member and fusion melting element, pre-fitted to yet another fuel system component.

Turning attention to FIG. 13, a fuel system component generally designated as 460 and a planar carrying member 462 adapted for being prefitted thereto is illustrated. By contrast to the previous examples, the fuel system component 460 is formed with three snap lock members 464 at a top surface 466 thereof, and is thereby adapted to be pre-fitted with the fusion melting element 300A via outwardly directed projections 468 and slots 470 formed with the planar carrying member 462 for receipt and snappingly engagement to the snap lock members 464. It should further be noted that the planar member 462 need not be circular, and in this example comprises a linear edge 472 such that the shape of the planar member 462 corresponds to that of the top surface 466 of the fuel system component 460. Additionally, the shape of the fusion melting element 474 is different. While a single round elongated conductive portion could be utilized, the present example optionally comprises an elongated conductive portion 476 having an outer path 478 around the periphery of the planar carrying member 462 and an inner path 480 closer to a central part 482 thereof. The use of a second path enables a stronger bond to be formed between the carrying member 462 and a fuel tank (not shown) to which it is to be attached, than if a single path were utilized.

Whilst several embodiments have been shown and described, it is to be understood that it is not intended thereby to limit the disclosure, but rather it is intended to cover all embodiments, modifications and arrangements falling within the spirit and the scope of the present invention, as defined in the appended claims, mutatis mutandis.

For example, the fusion melting element may be integrated a priori within one of the fuel element or the wall site of the fuel tank or, it may be introduced into a suitable receptacle formed in either of the fuel accessory or wall site. In accordance with a different alternative, the fusion melting element is merely introduced between the fuel accessory and the wall site.

The invention claimed is:

1. A fuel system component for attaching to a site at an inside wall portion of a plastic material fuel tank, the fuel system component comprising a housing having a top surface configured to be pre-fitted with a fusion melting element; wherein
the fusion melting element is in the form of a sheet of material and comprises first and second conductive ends configured to be detached from the fusion melting element when a pulling force is applied thereto.

2. The fuel system component of claim 1, wherein
said top surface is configured to be pre-fitted with the fusion melting element by being formed with grooves of sufficient size to allow the fusion melting element to be placed therein,
the top surface comprising plastic material of a height sufficient to allow attachment of fuel system component to said fuel tank by melting of the plastic material, without damaging the fuel system component.

3. The fuel system component of claim 2, wherein said fusion melting element is pre-fitted to the top surface of the housing by placement thereof in said grooves.

4. The fuel system component of claim 1, wherein said fusion melting element is attached to a planar weldable carrying member comprising an upper surface and an opposing lower surface.

5. The fuel system component of claim 4, wherein said lower surface of the planar weldable carrying member is configured to be pre-fitted to the top surface of the housing of the fuel system component by being formed with a mechanical joining mechanism.

6. The fuel system component of claim 5, wherein
the mechanical joining mechanism of the planar weldable carrying member is a first mechanical joining mechanism selected from only one of the group consisting of snap-lock members, threaded members and bayonet members; and
said top surface of the fuel system component is configured to be pre-fitted to the lower surface of the planar weldable carrying member by being formed with a second mechanical joining mechanism corresponding to that of the selected first mechanical joining mechanism of the planar weldable carrying member.

7. The fuel system component of claim 4, wherein said top surface of the housing is configured to be pre-fitted by having a bonding agent applied thereto and said lower surface of the planar weldable carrying member is pre-fitted thereto via the bonding agent.

8. The fuel system component of claim 1, wherein said housing further comprises a side wall extending from said top surface, and said side wall is a single-layered wall having an outer surface in fluid communication with said fuel tank and an inner surface in fluid communication with at least one functional component of said fuel system component.

9. The fuel system component of claim 1, wherein said top surface of the housing has a maximal diameter, and said fusion melting element has a maximal diameter smaller than the maximal diameter of the top surface of the housing.

10. The fuel system component of claim 1, wherein said fusion melting element further comprises elongated conductive portions, the elongated conductive portions including at least a first portion distal from a central part of the fusion melting element, and at least a second portion disposed intermediate the at least a first distal portion and the central part.

11. The fuel system component of claim 1, wherein said fusion melting element further comprises elongated conductive portions, the elongated conductive portions including a plurality of large C-shaped sub-portions connected in series by a plurality of small C-shaped sub-portions.

12. The fuel system component of claim 1, wherein said fuel system component is attached to at least one additional fusion melting element.

13. The fuel system component of claim 1, being selected from only one of the group consisting of vent valves, roll-over valves, over filling intermitting valves, liquid traps, gauges and filters.

14. The fuel system component of claim 1, further comprising an outlet nozzle adjacent said top surface.

15. The fuel system component of claim 1, wherein the first and second conductive ends are disposed on a common side of the fusion melting element.

16. The fuel system component of claim 1, wherein the top surface of the fuel system component is formed with a mechanical joining mechanism.

17. The fuel system component of claim 4, wherein the planar weldable carrying member comprises a lateral projection configured to help with snapping off the first and second conductive ends of the fusion melting element.

18. The fuel system component of claim 4, wherein the planar weldable carrying member is formed with a central circular aperture.

19. A planar weldable carrying member comprising an upper surface, an opposing lower surface, and a fusion melting element attached thereto; wherein
the fusion melting element is in the form of a sheet of material and comprises first and second conductive ends configured to be detached from the fusion melting element when a pulling force is applied thereto.

20. The planar weldable carrying member of claim 19, wherein said lower surface of the planar weldable carrying member is configured to be pre-fitted to a top surface of a housing of a fuel system component by being formed with a mechanical joining mechanism.

21. The planar weldable carrying member of claim 20, wherein the mechanical joining mechanism is selected from the group consisting of snap-lock members, threaded members and bayonet members.

22. The planar weldable carrying member of claim 19, wherein said lower surface of the planar weldable carrying member is configured to be pre-fitted to a top surface of a housing of a fuel system component by having a bonding agent applied thereto.

23. The planar weldable carrying member of claim 19, wherein
said fusion melting element further comprises elongated conductive portions,
the elongated conductive portions including at least a first portion distal from a central part of the fusion melting element, and
at least a second portion disposed intermediate the at least a first distal portion and the central part.

24. The planar weldable carrying member of claim 19, wherein said fusion melting element further comprises elongated conductive portions, the elongated conductive portions including a plurality of large C-shaped sub-portions connected in series by a plurality of small C-shaped sub-portions.

25. The planar weldable carrying member of claim 19, wherein the first and second conductive ends are disposed on a common side of the fusion melting element.

26. The planar weldable carrying member of claim 19, further comprising a lateral projection configured to help with snapping off the first and second conductive ends of the fusion melting element.

27. The planar weldable carrying member of claim 19, is formed with a central circular aperture.

28. A fuel tank made of a plastic material and fitted with at least one fuel system component attached to an inside surface of a wall thereof, wherein said fuel system component comprises a housing having a top surface configured to be prefitted with a fusion melting element and the fuel system component is attached to a predetermined site at said inside surface by fusion welding; wherein the fusion melting element is in the form of a sheet of material and comprises first and second conductive ends configured to be detached from the fusion melting element when a pulling force is applied thereto.

29. An attachable planar weldable carrying member comprising an upper surface, an opposing lower surface, and a fusion melting element attached to the upper surface, the planar weldable carrying member configured for attachment to a fuel system component by the lower surface of the planar weldable carrying member being formed with a mechanical joining mechanism extending in a direction away from the upper surface; the planar weldable carrying member being formed with a central circular aperture.

30. The planar weldable carrying member of claim 29, wherein said fusion melting element further comprises first and second conductive ends configured to be detached from the fusion melting element by applying a pulling force thereto, when the fusion melting element has been welded to another object.

31. The planar weldable carrying member of claim 29, wherein the fusion melting element is a coiled filament.

32. The planar weldable carrying member of claim 29, wherein the fusion melting element is an undulating filament.

33. The planar weldable carrying member of claim 29, wherein the fusion melting element is in the form of a sheet of material.

34. The planar weldable carrying member of claim 29, wherein the mechanical joining mechanism is selected from the group consisting of snap-lock members, threaded members and bayonet members.

35. The planar weldable carrying member of claim 29, wherein the first and second conductive ends are disposed on a common side of the fusion melting element.

36. The planar weldable carrying member of claim 29, further comprising a lateral projection configured to help with snapping off the first and second conductive ends of the fusion melting element.

37. The planar weldable carrying member of claim 29, wherein said fusion melting element further comprises elongated conductive portions, the elongated conductive portions including at least a first portion distal from a central part of the fusion melting element, and at least a second portion disposed intermediate the at least a first distal portion and the central part.

38. The planar weldable carrying member of claim 29, wherein said fusion melting element further comprises elongated conductive portions, the elongated conductive portions including a plurality of large C-shaped sub-portions connected in series by a plurality of small C-shaped sub-portions.

* * * * *